INVENTOR.
GUY STEELE

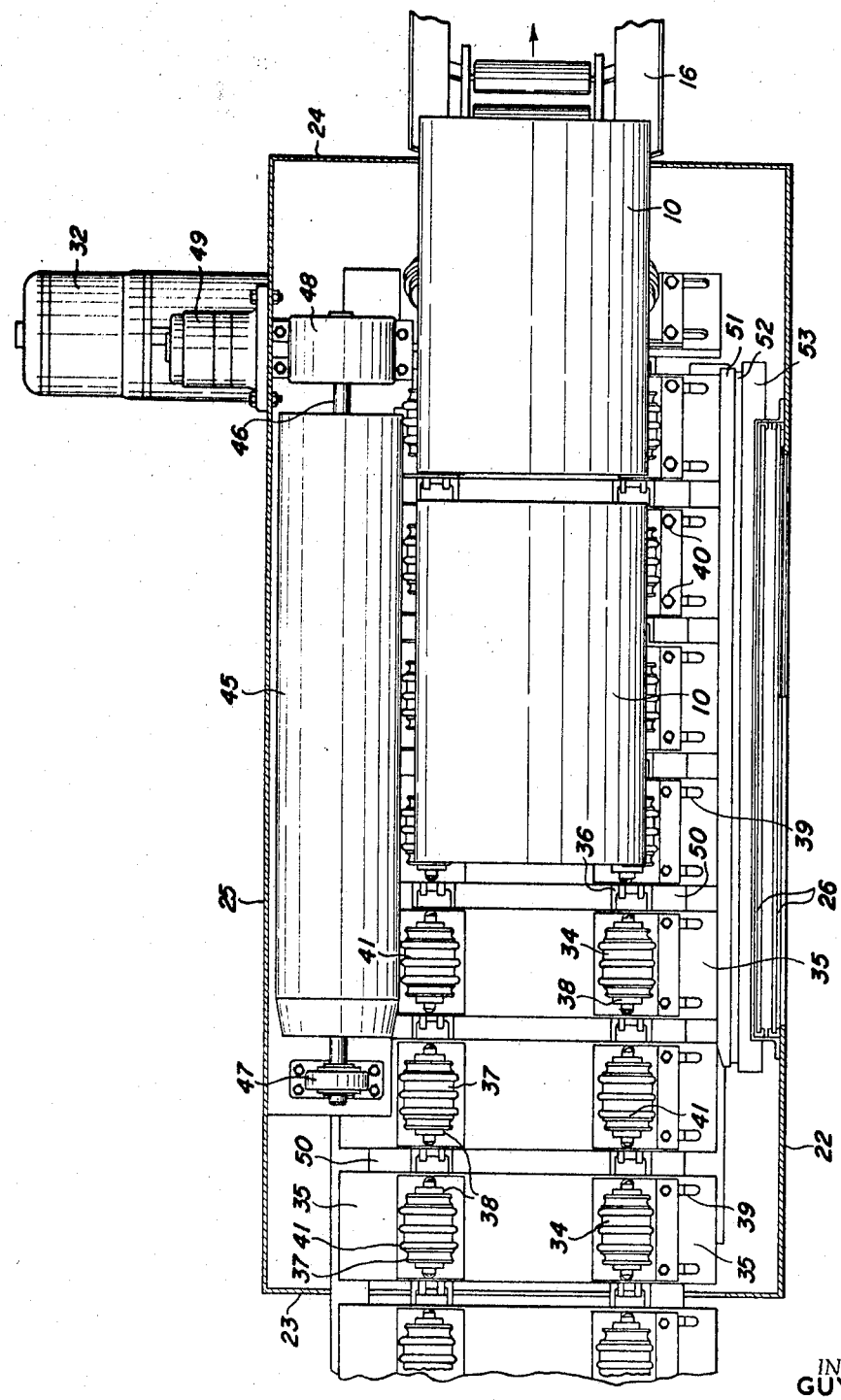

United States Patent Office
3,475,936
Patented Nov. 4, 1969

3,475,936
TRANSPORT SYSTEM
Guy Steele, Webster, N.Y., assignor to Xerox Corporation, Rochester, N.Y., a corporation of New York
Filed Oct. 24, 1966, Ser. No. 589,100
Int. Cl. B21j; B65g 47/24; B24b 1/00
U.S. Cl. 72—53                                    8 Claims

ABSTRACT OF THE DISCLOSURE

Apparatus for conveying a relatively small cylindrical work element through a work zone, said apparatus being adapted to impart a spiral motion to the cylindrical work element as it passes through said work zone.

---

This invention relates to conveying apparatus and, in particular, apparatus for transporting a cylindrical work element through a blast cabinet.

Conveyors utilizing trunnion mounts as a means of supporting a cylindrical work piece which is in transit have long been known in the art. Trunnion mounting, that is, the seating of a work piece on or between a series of small cylindrically shaped rolls, is a relatively simple and inexpensive means of supporting a work element. Smith, in U.S. Patent No. 3,207,289, discloses the use of trunnions which are mounted in a skewed position to impart a rotating motion to a moving cylindrical work piece seated thereon. However, in Smith, means must be provided to hold the work element against the skewed driving rolls so that the work element does not leave the rolls due to the resultant forces acting upon it. That is, the work would walk off the skewed roll because of the forces imparted to it if means were not provided to hold it in contact with the rolls. When the cylindrical work element is an elongated member such as a length of pipe or the like, driving means such as a belt feeding mechanism or the like can be mounted exterior to the conveyor to impart rotating motion to the work element.

However, it has been a problem to impart a rotational motion to a relatively small or light cylindrical work element which is in transit. For example, the handling of a relatively small work element within the work zone of a blast cabinet had been a problem because the small size of the work element necessitated that the handling apparatus also be present in the work zone. This physical presence of the handling apparatus created special problems when the work piece was to be subjected to the blast stream about a large portion or the entire outer periphery of its surface. Oftentimes the handling apparatus was such as to shield the work piece from the blast stream thereby making it difficult or impossible to completely work the entire element. Further, the continued exposure of the supporting or holding apparatus to the blast stream tended to wear or erode away the holder thus requiring frequent replacement.

Hand supporting and turning of small work elements is resorted to in many cases. The work piece is first placed in the work zone and the operator then grasps it by inserting his hands into a pair of heavy flexible gloves made of rubber or the like which extend into the work zone. The shot working operation is then performed by the operator manually placing and turning the work element in the shot stream. Although relatively inexpensive, such manual shot working operations are time consuming and do not lend themselves for use in continuous processes.

Special jigs and fixtures are available to support and turn a small work element while it is being shot worked. Generally, the work piece is supported or rotated in a fixed position while the nozzle is moved back and forth over the work area until the entire surface of the element has been worked. Here again the work piece must be loaded and unloaded into the fixture by hand which proves time consuming. Control and movement of the nozzle to encompass the entire surface area of the work element oftentimes requires special and intricate apparatus which is costly.

A relatively inexpensive and simple method to support a small work element while it is being shot worked is disclosed by Mott in U.S. Patent No. 2,357,599. The work piece is placed in a cylindrical cage, much like that used in tumbling operation, and the cage then rotated through a shot stream so that after a period of time the complete outer surface of the tumbling part is subjected to shot working. However, just as in normal tumbling operations, the work piece is subjected to forces which are capable of damaging relatively soft materials. The continuous agitation of the article within the cylinder may be such as to dent or break relatively soft material such as aluminum, brass and the like. Further, this type of apparatus does not lend itself to use in a continuous process because the work element must be hand loaded and unloaded into the tumbling cylinder.

It is therefore an object of this invention to improve apparatus for conveying a cylindrical work element.

A further object of this invention is to impart a rotating motion to a small cylindrical work element which is being conveyed.

Another object of this invention is to improve apparatus for transporting a work element through a blast cabinet.

It is a further object of this invention to improve apparatus for continually transporting a cylindrically shaped work element through a blast cabinet.

It is another object of this invention to improve apparatus for shot working the entire outside periphery of a small cylindrical work element.

Another object of this invention is to provide shot working apparatus for continually transporting a relatively small work piece past a fixed blast stream so that the entire outer surface of the cylinder is worked.

A still further object of this invention is to improve apparatus for transporting a relatively soft work element through a blast cabinet without damaging the work element in handling.

These and other objects of this invention are achieved by seating a cylindrical work element upon a conveyor and transporting the work element through a blast cabinet. A rotating motion is imparted to the work element as it passes a fixed nozzle or nozzles located in the work zone of the blast cabinet so that the entire outer periphery of the cylindrical work element is exposed to the action of a blast stream.

For a better understanding of this invention as well as other objects and further features thereof, reference is had to the following detailed description of the invention to be read in connection with the following drawings, wherein:

FIG. 2 is a partial section through the blast cabinet shown in FIG. 1 and taken along line 2—2 of FIG. 1.

Figure 1:
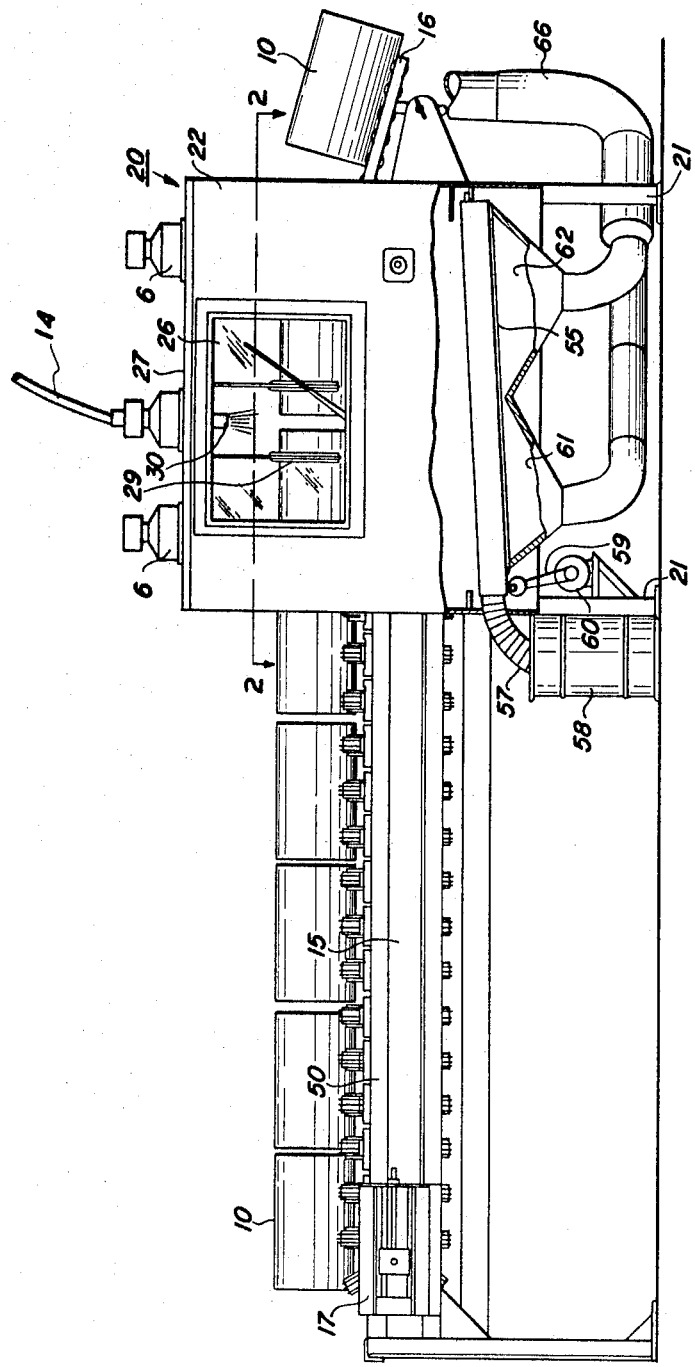
FIG. 1 is a side elevation of the blast cabinet and conveyor system of the present invention.

Referring to FIG. 1, apparatus is shown for automatically blasting or peening a cylindrical drum. Drum 10 is loaded by the operator upon endless chain belt conveyor 15 which transports the drums through blast cabinet 20. The blast cabinet, generally indicated 20, is supported by legs 21 and includes front and rear walls and opposite end walls designated 22 thru 25, respectively. Front wall 22 contains a window 26 through which the operator may view drums in the cabinet during the blasting operations. End walls 23 and 24 have ingress and egress ports, respectively, therein through which a drum seated on conveyor 15 can be transported in and out of the blast cabinet. Located at the egress port is a gravity roll conveyor 16 capable of transporting drums leaving the endless belt out of the blast cabinet.

Mounted along the roof 27 of the blast cabinet are a series of nozzle receptors 28 capable of receiving and holding blast nozzle 30 in a position so that a shot stream is directed towards the work being transported through blast cabinet 20. The nozzles are supplied with shot from a blast generator (not shown) through line 14. Blast shields 29 are slidably mounted in the cabinet to contact shot particles and material removed from the drum within a defined work zone. The work zone is defined by the area over which the nozzle directs shot particles and the size of this work zone will vary as the number of nozzles and the angle at which the nozzles are mounted and the distance from nozzle to work is varied.

Transport conveyor 15 comprises a series of flat base plates 35 which are flexibly joined by means of links 36 so that the plates cooperate to form an endless chain. The endless chain is driven in the direction indicated, by means of drive motor 32 (FIG. 2), or any suitable drive mechanism, acting in conjunction with a transmission or reducer (not shown) to control the speed of the endless chain. A chain adjuster 17 is also provided to control the tension on the endless chain.

Referring now to FIG. 2, each individual base plate 35 has affixed thereon two separate U-shaped cradles 38 having rotatably mounted therein a cylindrical shaped trunnion. As seen in FIG. 2, the two trunnions are mounted so that their center lines are substantially parallel to each other and parallel to the direction of belt travel. The rear fixed trunnion 37, that is, the trunnion which is mounted closest to rear wall 25 of the blast cabinet, is permanently affixed to the base plate 35 while the forward movable trunnion 34 is slidably mounted on the base plate in slotted holes 39. Drums of varying sizes are accommodated by simply loosening bolts 40 and adjusting the distance between the two parallel trunnions so that the drum is properly seated therebetween. Positioned along the cylindrical body of trunnions 34 and 37, and coaxial therewith, are a series of rings 41 made of silicone rubber or similar resilient material having good wear properties as well as a high coefficient of friction. Work elements 10, as shown in FIG. 2, are seated between the two rows of trunnions and are in friction bearing contact with the rings 41.

As previously noted, the nozzle or nozzles located in the work zone are retained therein in a stationary position. In order to shot work the entire surface area of the drum, the drum is rotated as it is transported past the shot stream. The drum is thus worked in a spiral fashion which is geometrically similar to the shape described by a screw as it is screwed into a nut.

Referring once again to FIG. 2, the stationary or fixed row of trunnions 37 are brought into contact with cylindrical drive roll 45 so that the silicone rubber rings mounted on the trunnions are in friction contact with the drive roll. Cylindrical drive roll 45 is rotatably mounted on shaft 46 which is journaled at one end in bearing housing 47 and at the other end in gear box 48. Driving power to the drive roll is supplied by drive motor 49 through gear box 48, the speed of rotation being controlled by selection of the desired gear ratio.

Rotational forces are imparted to the work piece from cylindrical drive roll 45 through means of trunnion 37 as the work is being moved through the work zone. Upon entering the blast cabinet, the flat base plates comprising the endless chain come in sliding contact with two rails 50 which place the fixed row of trunnions at the proper elevation so that the rubber rings mounted thereon contact the cylindrical drive roll at approximately its horizontal center lines. Guide plate 51, located in the front of the cabinet, is biased into contact with the flat base plate 35 making up the endless chain transport by means of rubber member 52. This biasing pressure holds trunnions 37 in bearing contact with the cylindrical drive rolls 45 while the trunnion is in the work zone so that the proper rotational motion is imparted to work element 10 mounted thereon.

The rubber rings 41 mounted on trunnions 37, because they are in one point bearing contact against rotating cylindrical drive roll 45, will "walk" across the drive roll as they move through the work zone. Although there is some skidding or rubbing due to rubber rings being moved laterally across the cylindrical drive roll, the frictional force resulting is very slight and does not appreciably hamper the operation of the apparatus or wear characteristics of the rings. Tests have been conducted in which a cylinder of approximately 10 inches in diameter has been transported past a nozzle using a 1 inch lead, that is, 1 inch traversing advancement for each turn of the drum, without any noticeable signs of binding or wear.

Referring once again to FIG. 1, located in the bottom of blast cabinet 20, is a vibratory bed 55 upon which particles and shot being dislodged from a drum fall. A screen is mounted in the bed to pass all the shot and smaller particles while holding the larger pieces thereon. The bed is inclined toward one end of the cabinet so that larger particles retained thereon will move under the vibratory action towards the low end of bed 55. Located at the low end of the bed is an opening to which is affixed flexible line 57 through which the large particles fall into recovery receptacle 58. The vibratory bed is oscillated by means of eccentric arm 59 which is being rotated by drive motor 60.

Located in the work zone between the upper delivery section of the endless belt and the lower return section thereof is a series of baffle plates (not shown) which direct the flow of shot and particles leaving a work piece around the belt rather than through the lower return section so that all of the residue from the blasting operation will fall on the vibratory screen rather than being carried out of the cabinet on the conveyor belt. The shot and smaller particles passed through the screen fall into funnel shaped conveyors 61 and 62 where they can be carried away through line 66 for separation and reprocessing.

A wide flexibility of operation is given to the present invention by providing means to control the transport speed as well as the speed at which the work will be rotating thus enabling an operator to set the lead of a work element. That is, the operator can control the amount of surface area at which a work element advances that is working per unit time much as a lathe operator can control "cutting speed" by the proper selection of speeds and feeds. For example, the apparatus of the present invention can be utilized to strip an outer component or coating from a support material, or it may be employed to obtain a high matte finish on a specified material. In the present invention the desired lead having once been determined can be set into the apparatus by adjusting the speed of the transport and the rotation speed of the cylindrical drive member to impart a resultant spiral motion to a work element so that a desired amount of work surface passes the fixed shot stream per unit of time. It should be also noted that sufficient chain length is located outside of the blast cabinet to permit either manual or automatic loading of work elements thereon so that a continuous flow of work is delivered to the work zone.

While this invention has been described with reference to the structure disclosed herein, it is not confined to the details as set forth, and this application is intended to cover such modifications or changes as may come within the purposes of the improvements of the scope of the following claims.

What is claimed is:

1. Apparatus for conveying a relatively small cylindrical work element through a work zone including
a transport having mounted thereon two substantially parallel rows of coaxially mounted trunnions capable of supporting a cylindrical work element therebetween,
said transport positioned to move the trunnions and a work element supported thereon through said work zone in a substantially axial horizontal position,
means to rotate at least one row of coaxially mounted trunnions as they pass through the work zone whereby a spiral motion is imparted to the work element supported thereon.

2. The appartus of claim 1 wherein said transport comprises a plurality of base plates flexibly connected to form an endless chain, said plates having mounted thereon two trunnions capable of supporting a cylindrical work element therebetween whereby two substantially parallel rows of coaxially mounted trunnions are formed on said endless chain.

3. The apparatus of claim 2 wherein said means to rotate the trunnions comprises a cylindrical drive member mounted in the work zone in contact with one row of coaxially mounted trunnions to rotate the trunnions as they move through the work zone whereby a rotational motion is imparted to a work element seated thereon.

4. The apparatus of claim 3 wherein the second row of trunnions are adjustably mounted on said transport capable of being repositioned to accommodate work elements of various diameters.

5. The apparatus of claim 4 wherein the trunnions capable of contacting said cylindrical drive member are biased into contact with said member as they move through said work zone.

6. The apparatus of claim 5 having provided further means operable to control the speed of the transport through said work zone, and means to control the rotational speed of said cylindrical drive member contacting said trunnions whereby a resultant spiral motion is imparted to said work element.

7. Apparatus for shot working multiple cylindrical work elements including
a blast cabinet having a horizontal work zone for receiving a work element in substantially axial horizontal position,
nozzle means postioned in said cabinet for directing a stream of air entrained particles against a work element in said work zone,
a transport having a plurality of base plates connected to form an endless chain and having mounted thereon two substantially parallel rows of coaxially positioned trunnions capable of supporting cylindrical work elements therebetween,
a cylindrical drive member mounted in said work zone in contact with a row of coaxially mounted trunnions adapted to rotate the trunnions as they move through said work zone,
means located in said work zone for biasing said trunnions into contact with the cylindrical drive member,
means operable to control the speed of the transport through said work zone and to control the rotational speed of said cylindrical drive member whereby a desired resultant spiral motion is imparted to the work element as it passes through said stream of air entrained particles.

8. The apparatus of claim 7 wherein the second row of trunnions are adjustably mounted on said endless chain and being capable of being repositioned to accommodate work elements of various diameters.

References Cited

UNITED STATES PATENTS

| 2,249,677 | 7/1941 | Wallace | 72—53 |
| 2,341,674 | 2/1944 | Wallace | 72—53 |
| 2,542,955 | 2/1951 | Young | 72—53 |
| 3,328,925 | 7/1967 | Hewitt | 51—319 |

CHARLES W. LANHAM, Primary Examiner

G. P. CROSBY, Assistant Examiner

U.S. Cl. X.R.

51—319; 198—33